United States Patent
Choi et al.

(10) Patent No.: US 9,730,238 B2
(45) Date of Patent: Aug. 8, 2017

(54) COMMUNICATION APPARATUS AND DATA FRAME TRANSMISSION METHOD OF THE SAME

(71) Applicant: ELECTRONICS AND TELECOMMUNICATIONS RESEARCH INSTITUTE, Daejeon (KR)

(72) Inventors: Jee Yon Choi, Daejeon (KR); Jae Woo Park, Daejeon (KR); Yu Ro Lee, Daejeon (KR); Jae Seung Lee, Daejeon (KR); Il Gyu Kim, Chungcheongbuk-do (KR); Seung Chan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 58 days.

(21) Appl. No.: 14/734,733

(22) Filed: Jun. 9, 2015

(65) Prior Publication Data

US 2015/0358961 A1    Dec. 10, 2015

(30) Foreign Application Priority Data

Jun. 10, 2014 (KR) .................. 10-2014-0070107
Jun. 11, 2014 (KR) .................. 10-2014-0071060
Apr. 8, 2015 (KR) .................. 10-2015-0049677

(51) Int. Cl.
| | | |
|---|---|---|
| H04W 72/04 | (2009.01) | |
| H04W 72/12 | (2009.01) | |
| H04W 84/12 | (2009.01) | |

(52) U.S. Cl.
CPC ............ *H04W 72/12* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,605,692 B2 | 12/2013 | Kim et al. | |
| 2009/0279524 A1* | 11/2009 | Yu ................. | H04W 74/0833 370/338 |
| 2011/0096711 A1* | 4/2011 | Liu ................. | H04W 74/008 370/312 |
| 2012/0106419 A1* | 5/2012 | Gonikberg ........ | H04W 8/005 370/311 |
| 2012/0257574 A1 | 10/2012 | Seok et al. | |
| 2013/0315220 A1* | 11/2013 | Wang .............. | H04W 48/02 370/338 |

(Continued)

FOREIGN PATENT DOCUMENTS

KR    10-2010-0084139 A    7/2010

*Primary Examiner* — Chi H Pham
*Assistant Examiner* — Soon-Dong D Hyun

(57) ABSTRACT

Provided is a data frame transmission method of a communication apparatus, the method including determining whether a transmission allowance condition of a data frame of the communication apparatus is satisfied when another communication apparatus occupies a channel, verifying an end time of another data frame transmitted by the other communication apparatus based on a result of the determining, and transmitting the data frame based on the verified end time.

18 Claims, 9 Drawing Sheets

(56) References Cited

U.S. PATENT DOCUMENTS

| | | | |
|---|---|---|---|
| 2014/0146715 A1* | 5/2014 | Aggarwal | H04L 5/14 370/276 |
| 2014/0177546 A1 | 6/2014 | Kang et al. | |
| 2015/0296517 A1* | 10/2015 | Yu | H04L 25/03866 370/338 |
| 2016/0174262 A1* | 6/2016 | Xing | H04W 74/08 370/329 |
| 2016/0192397 A1* | 6/2016 | Kim | H04W 74/006 370/336 |

* cited by examiner

| BW |
|---|
| Reserved |
| STBC |
| Group ID |
| SU NSTS / MU[0] NSTS | MU[1] NSTS | MU[2] NSTS | MU[3] NSTS |
| NSTS/Partial AID | Partial AID |
| TXOP_PS_NOT_ALLOWED |
| Reserved |
| Short GI |
| Short GI NSYM Disambiguation |
| SU/MU[0] Coding |
| LDPC Extra OFDM Symbol |
| MU[1] Coding | MU[2] Coding | MU[3] Coding | Reserved |
| NSTS/Partial AID | NSTS/Partial AID |
| Beamformed | Beamformed | Reserved |
| Reserved |
| CRC |
| Tail |

510 points to Group ID
520 points to NSTS/Partial AID row

COMMUNICATION APPARATUS AND DATA FRAME TRANSMISSION METHOD OF THE SAME

CROSS-REFERENCE TO RELATED APPLICATION

This application claims the priority benefit of Korean Patent Application No. 10-2014-0070107 filed on Jun. 10, 2014, Korean Patent Application No. 10-2014-0071060 filed on Jun. 11, 2014, and Korean Patent Application No. 10-2015-0049677 filed on Apr. 8, 2015 in the Korean Intellectual Property Office, the disclosures of which are incorporated herein by reference.

BACKGROUND

1. Field of the Invention

Example embodiments of the present invention relate to a medium access control (MAC) protocol of a wireless local area network (WLAN), and more particularly, to a method of simultaneously transmitting data by at least two apparatuses in an overlapping basic service set (BSS) environment.

2. Description of the Related Art

In a developing wireless local area network (WLAN) environment, a service area of an access point, a basic service set (BSS) may overlap another BSS of another access point. The foregoing example may also be referred to as, for example, an overlapped BSS (OBSS). The OBSS may cause degradation in transmission efficiency of the BSS.

SUMMARY

According to an aspect of the present invention, there is provided a data frame transmission method of a communication apparatus, the method including determining whether a transmission allowance condition of a data frame of the communication apparatus is satisfied when another communication apparatus occupies a channel, verifying an end time of another data frame transmitted by the other communication apparatus based on a result of the determining, and transmitting the data frame based on the verified end time.

The determining may include determining whether the transmission allowance condition is satisfied based on whether listening to each of a request to send (RTS) transmitted by the other communication apparatus and a clear to send (CTS) corresponding to a response to the RTS is transmitted.

The determining may include setting a network allocation vector (NAV) based on a result of listening to the RTS, initializing the NAV when the communication apparatus does not listen to the CTS, and determining that transmission of the data frame of the communication apparatus is allowed based on a result of the initializing.

The verifying may include listening to the another data frame and verifying length information on the another data frame based on a result of the listening.

The data frame transmission method may further include generating the data frame such that an end time of the data frame matches the verified end time.

The generating may include adjusting a length of the data frame when the end time of the data frame differs from the verified end time.

The communication apparatus may be a first access point, and the other communication apparatus may be a terminal located in an overlapping area between a service area of the first access point and a service area of a second access point connected to the other communication apparatus.

The other communication apparatus may be an access point capable of performing data frame transmission and data frame reception in the channel, simultaneously.

According to another aspect of the present invention, there is also provided a data frame transmission method of a communication apparatus, the method including determining whether the communication apparatus is allowed to perform data frame transmission to another communication apparatus while a channel is occupied by the other communication apparatus, and transmitting, based on a result of the determining, a data frame of the communication apparatus such that an end time of the data frame matches an end time of another data frame transmitted by the other communication apparatus.

The determining may include setting an NAV based on a result of listening to an RTS transmitted by the other communication apparatus, and initializing the NAV when the communication apparatus does not listen to a CTS corresponding to a response to the RTS.

The transmitting may include listening to the another data frame and verifying length information on the another data frame based on a result of the listening, and generating the data frame based on the length information.

The transmitting may include adjusting a length of the data frame when the end time of the data frame differs from the end time of the another data frame.

According to still another aspect of the present invention, there is also provided a communication apparatus including a processor configured to determine whether a transmission allowance condition of the communication apparatus is satisfied when another communication apparatus occupies a channel and verify an end time of another data frame transmitted by the other communication apparatus based on a result of the determining, and a transmitter configured to transmit the data frame based on the verified end time.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5 illustrates an example of a very high throughput-signal-A (VHT-SIG-A) of the data frame of FIG. 4;

DETAILED DESCRIPTION

Figure 1:
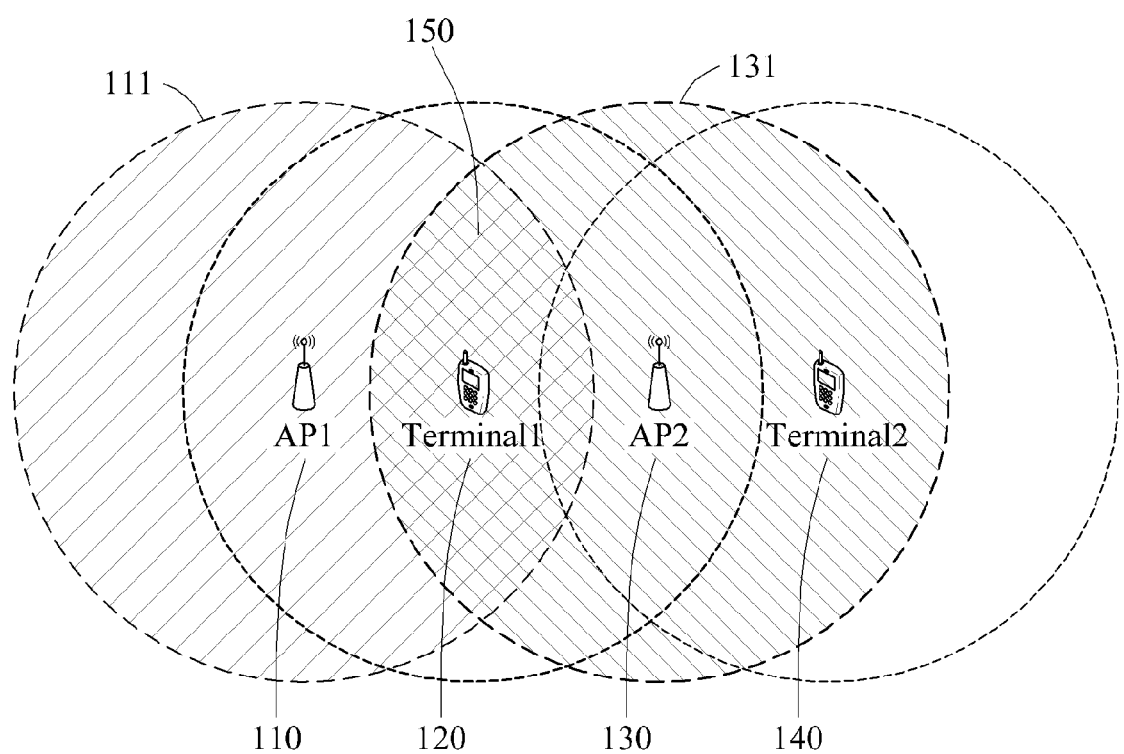
FIG. 1 illustrates an example of a wireless network environment.

Hereinafter, exemplary embodiments will be described in detail with reference to the accompanying drawings, wherein like reference numerals refer to like elements throughout.

Various alterations and modifications may be made to the exemplary embodiments, some of which will be illustrated in detail in the drawings and detailed description. However, it should be understood that these embodiments are not construed as limited to the illustrated forms and include all changes, equivalents or alternatives within the idea and the technical scope of this disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined a detailed description of a related known function or configuration they may make the purpose of the present invention unnecessarily ambiguous in describing the present invention, the detailed description will be omitted herein.

FIG. 1 illustrates an example of a wireless network environment.

Referring to FIG. 1, a terminal 120 may be connected to an access point 110, and a terminal 140 may be connected to an access point 130. In the present disclosure, the terminal 120, the terminal 140, the access point 110, and the access point 130 may also be referred to as, for example, Terminal1, Terminal2, AP1, and AP2, respectively. For example, the terminal 120 may be located in a service area 111 of the access point 110, and the terminal 140 may be located in a service area 131 of the access point 130.

Each of the service area 111 and 131 may also be referred to as, for example, a basic service set (BSS).

The service area 111 of the access point 110 may overlap the service area 131 of the access point 130, and the terminal 120 may be located in an overlapping area 150 therebetween. The terminal 120 can listen to a packet transmitted by the access point 110 and a packet transmitted by the access point 130. Also, the access point 130 can listen to a packet transmitted by the terminal 120 and a packet transmitted by the terminal 140.

Figure 2:
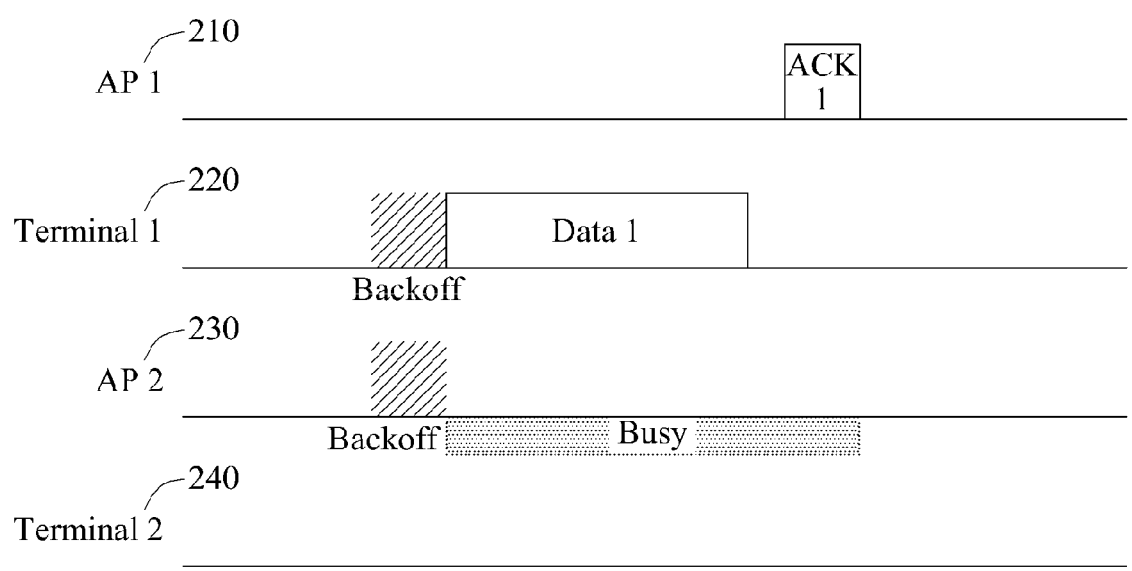
FIG. 2 illustrates an example of a communication apparatus operating in the wireless network environment of FIG. 1.

FIG. 2 illustrates an example of a communication apparatus operating in the wireless network environment of FIG. 1.

The access point 110 of FIG. 1 may correspond to an access point 210 of FIG. 2, and the access point 130 of FIG. 1 may correspond to an access point 230 of FIG. 2. Also, the terminal 120 of FIG. 1 may correspond to a terminal 220 of FIG. 2, and the terminal 140 of FIG. 1 may correspond to a terminal 240 of FIG. 2.

Referring to FIG. 2, when a channel status becomes idle, the terminal 220 and the access point 230 may perform a random backoff. In this example, the terminal 220 and the access point 230 may perform the random backoff for data frame transmission.

When the terminal 220 completes the random backoff in advance, the terminal 220 may transmit a data frame to the access point 210. The access point 230 may listen to the data frame transmitted from the terminal 220 to the access point 210. For example, the access point 230 may listen to a duration field included in the data frame.

The access point 230 may set a network allocation vector (NAV) based on a value included in the duration field.

The duration field may include a time interval from an end time of the data frame to an end time of a response to the data frame. In FIG. 2, the terminal 220 may set the duration field by using the time interval. The access point 230 may set the NAV until the end time of ACK 1 corresponding to a response to Data 1. Until the NAV ends, the access point 230 may recognize that the channel status is busy. The access point 230 may not transmit the data frame to the terminal 240 using the channel until the NAV ends.

In FIG. 2, the access point 230 may not transmit the data frame to the terminal 240 due to a channel occupation of the terminal 220.

Figure 3:
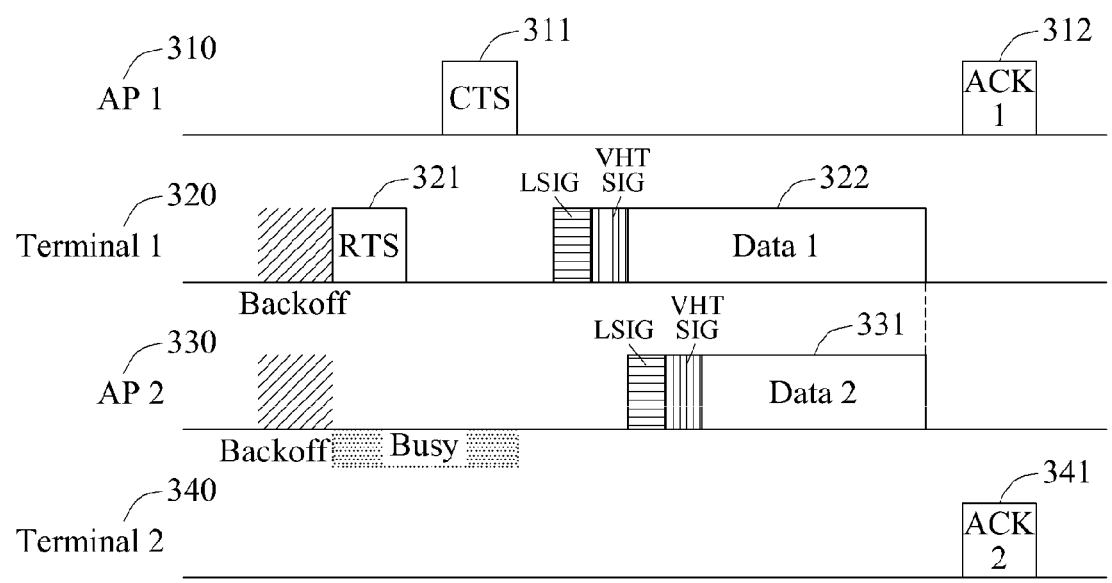
FIG. 3 illustrates another example of a communication apparatus operating in the wireless network environment of FIG. 1.

FIG. 3 illustrates another example of a communication apparatus operating in the wireless network environment of FIG. 1.

The access point 110 of FIG. 1 may correspond to an access point 310 of FIG. 3, and the access point 130 of FIG. 1 may correspond to an access point 330 of FIG. 3. Also, the terminal 120 of FIG. 1 may correspond to a terminal 320 of FIG. 3, and the terminal 140 of FIG. 1 may correspond to a terminal 340 of FIG. 3.

The access point 310 and a terminal 320 may be included in a first BSS, and the access point 330 and a terminal 340 may be included in a second BSS. The terminal 320 may be located in an overlapping area between the first BSS and the second BSS, and basically, included in the first BSS.

In the wireless network environment of FIG. 1, the communication apparatus may be, for example, the access point 330.

Referring to FIG. 3, when a channel status becomes idle, the terminal 320 and the access point 330 may perform a random backoff. In this example, the terminal 320 and the access point 330 may perform the random backoff for data frame transmission.

When the terminal 320 completes the random backoff in advance, the terminal 320 may occupy the channel. Also, the terminal 320 may transmit a request to send (RTS) 321 to the access point 310. In response to the RTS 321, the access point 310 may transmit a clear to send (CTS) 311 to the terminal 320. The terminal 320 may receive the CTS 311 and then, transmit a data frame 322 to the access point 310.

The access point 330 can listen to a packet transmitted by the terminal 320 and cannot listen to a packet transmitted by the access point 310. Among communication apparatuses included in another BSS, for example, the second BSS, the access point 330 can listen to the RTS 321 and not listen to the CTS 311. The access point 330 and the access point 310 cannot listen to each other.

The access point 330 may set an NAV based on a result of listening to the RTS 321. The access point 330 may recognize that the channel status is busy. The access point 330 cannot listen to the CTS 311 transmitted by the access point 310 and thus, may initialize the NAV. Since the access point 330 and the access point 310 cannot listen to each other, the access point 330 may verify that each of the access point 330 and a communication apparatus, for example, the terminal 320, transmitting the RTS 321 is allowed to transmit a data frame, simultaneously. In this example, a target of the access point 330 may be the terminal 340, and a target of the terminal 320 may be the access point 310. The aforementioned term "simultaneously" may include, but is not limited to, the access point 330 and the terminal 320 transmitting the data frame at an identical point in time. The access point 330 may recognize a busy state of the channel as an available state of the channel.

The access point 330 may match an end time of a data frame 331 transmitted by the access point 330 to an end time of a data frame 322 transmitted by the terminal 320. Hereinafter, related descriptions will be provided with reference to FIG. 4.

Figure 4:
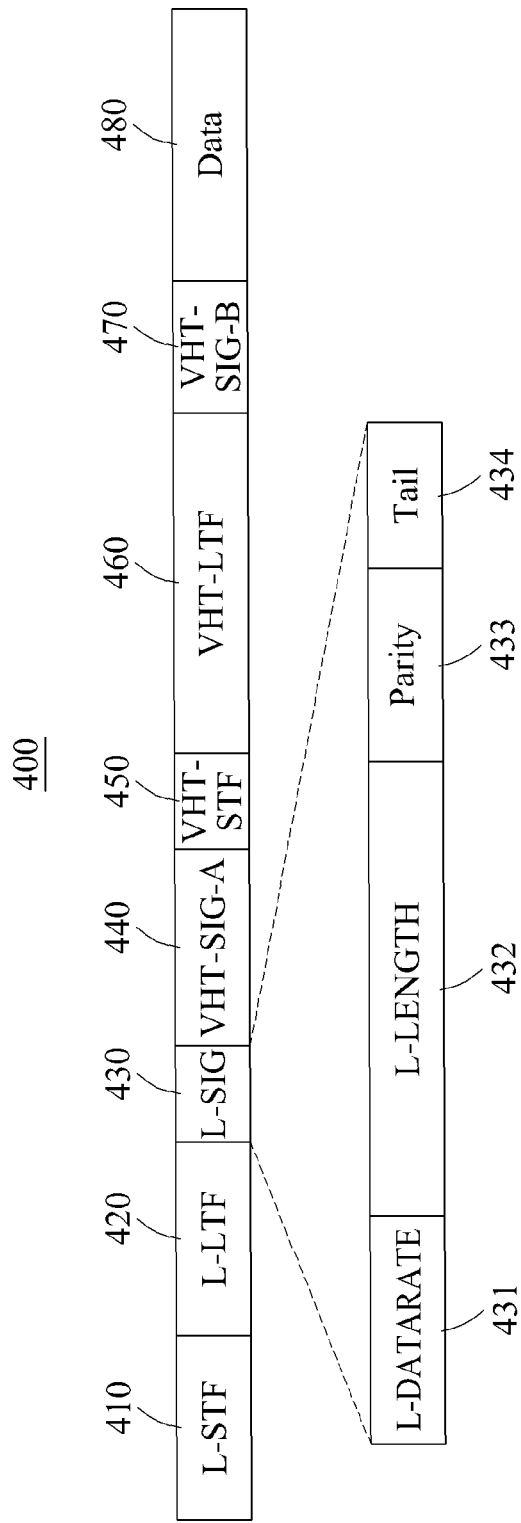
FIG. 4 illustrates an example of a data frame transmitted by a communication apparatus.

FIG. 4 illustrates an example of a data frame 400 transmitted by a communication apparatus.

The terminal 320 of FIG. 3 may transmit the data frame 400 to the access point 310. The data frame 400 may include a plurality of fields. For example, the data frame 400 may include a legacy-short training field (L-STF) 410, a legacy-long training field (L-LTF) 420, a legacy-signal (L-SIG) field 430, a very high throughput-signal-A (VHT-SIG-A) field 440, a very high throughput-short training field (VHT-STF) 450, a very high throughput-long training field (VHT-LTF) 460, a very high throughput-signal-B (VHT-SIG-B) field 470, and a data field 480.

The L-SIG field 430 may include a plurality of subfields. For example, the L-SIG field 430 may include an L-data rate field 431, an L-length field 432, a parity field 433, and a tail field 434.

The access point 330 can listen to the L-SIG field 430 of the data frame 400. The access point 330 may verify a temporal length of the data frame 400 based on the L-data rate field 431 and the L-length field 432 included in the L-SIG field 430. Based on the verified temporal length, the access point 330 may compute an end time of the data frame 400 transmitted by the terminal 320.

Referring back to FIG. 3, the access point 330 may compute an end time of the data frame 322 based on a length of the data frame 322 transmitted by the terminal 320. The access point 330 may match the computed end time to an end time of the data frame 331 to be transmitted. As an example, when the computed end time differs from the end time of the data frame 331 due to a large quantity of data to be transmitted to the terminal 340, the access point 330 may divide the data. Also, when the computed end time differs from the end time of the data frame 331 due to a lower quantity of data to be transmitted to the terminal 340, the access point 330 may insert a padding to the data frame 331.

When the end time of the data frame 322 differs from the end time of the data frame 331, interference may occur such that the access point 330 and the terminal 320 abnormally receive an acknowledgement field. Hereinafter, the acknowledgement field may also be referred to as, for example, ACK. As an example, transmission of the data frame 322 may be terminated before transmission of the data frame 331 is terminated. In this example, the transmission of the data frame 331 may affect the terminal 320 as the interference and thus, the terminal 320 may abnormally receive an ACK 1 312. To prevent an occurrence of the interference, the end time of the data frame 322 may need to be matched to the end time of the data frame 331.

The access point 310 may transmit the ACK 1 312 to the terminal 320 in response to the data frame 322. The terminal 340 may transmit an ACK 2 341 to the access point 330 in response to the data frame 331.

A time at which the transmission of the data frame 322 is terminated may match a time at which the transmission of the data frame 331 is terminated to the ACK 1 312, and the ACK 2 341 may be transmitted simultaneously. The terminal 320 may listen to the ACK 1 312, and cannot listen to the ACK 2 341. The access point 330 cannot listen to the ACK 1 312, and may listen to the ACK 2 341.

In an example, based on a predetermined field of the data frame 322 transmitted by the terminal 320, the access point 330 may verify that the data frame 322 differs from a data frame to be received by the access point 330. Hereinafter, related descriptions will be provided with reference to FIG. 5.

FIG. 5 illustrates an example of a VHT-SIG-A of the data frame of FIG. 4.

Referring to FIG. 5, a VHT-SIG-A field 500 of a data frame may include a plurality of subfields. The VHT-SIG-A field 500 may include, for example, a group identification (ID) field 510 and a partial association ID (AID) field 520.

Based on the group ID field 510 and the partial AID field 520, the access point 330 may verify that the data frame 322 differs from a data frame to be received by the access point 330.

Figure 6:
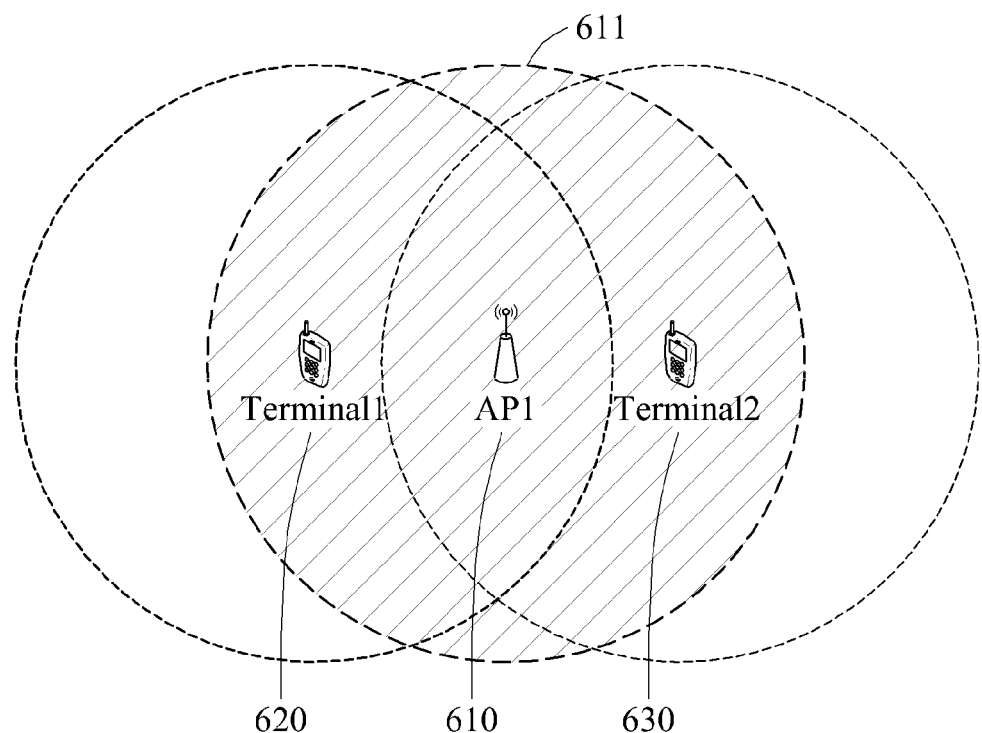
FIG. 6 illustrates another example of a wireless network environment.

FIG. 6 illustrates another example of a wireless network environment.

Referring to FIG. 6, a terminal 620 and a terminal 630 may be located in a service area 611 of an access point 610. The terminal 620 and the terminal 630 may access the access point 610. In the present disclosure, the terminal 620, the terminal 630, and the access point 610 may also be referred to as, for example, Terminal1, Terminal2, and AP1, respectively. While being included in the same BSS, each of the terminal 620 and the terminal 630 cannot listen to each other. For example, the terminal 620 cannot listen to a data frame transmitted by the terminal 630, and the terminal 630 cannot listen to a data frame transmitted by the terminal 620.

The access point 610 may simultaneously transmit and receive data in a channel. The access point 610 may support an in-band simultaneous transmit and receive (STR). For example, by using the channel, the access point 610 may perform data frame transmission to the terminal 610 while performing data frame reception from the terminal 630.

Figure 7:
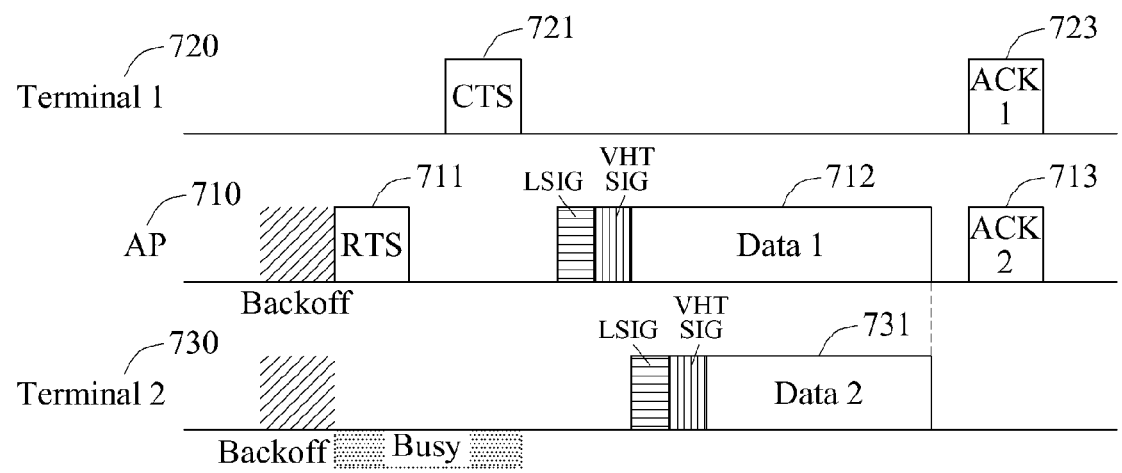
FIG. 7 illustrates an example of a communication apparatus operating in the wireless network environment of FIG. 6.

FIG. 7 illustrates an example of a communication apparatus operating in the wireless network environment of FIG. 6.

The access point 610 of FIG. 6 may correspond to an access point 710 of FIG. 7. Also, the terminal 620 of FIG. 6 may correspond to a terminal 720 of FIG. 7, and the terminal 630 of FIG. 6 may correspond to a terminal 730 of FIG. 7.

In the wireless network environment of FIG. 6, the communication apparatus may be, for example, the terminal 730.

Referring to of FIG. 7, when a channel status becomes idle, the access point 710 and the terminal 730 performs a random backoff. In this example, the access point 710 and the terminal 730 may independently perform the random backoff for data frame transmissions. In this example, the access point 710 may support an in-band STR.

When the access point 710 completes the random backoff in advance, the access point 710 occupies the channel. Also, the access point 710 may transmit an RTS 711 to the terminal 720. In response to the RTS 711, the terminal 720 may transmit a CTS 311 to the access point 710. The access point 710 may receive the CTS 721 and then, transmit a data frame 712 to the terminal 720.

The terminal 730 can listen to a packet transmitted by the access point 710 and cannot listen to a packet transmitted by the terminal 720. The terminal 730 can listen to the RTS 711 and cannot listen to the CTS 721. The terminal 720 and the terminal 730 may be mutually in a hidden state.

When the terminal 730 listens to the RTS 711 and does not listen to the CTS 721, the terminal 730 may verify that the terminal 730 is allowed to transmit the data frame 731 to the access point 710. Since the access point 710 supports the in-band STR, the data frame 712 may be transmitted and the data frame 731 may be received through the same channel.

The terminal 730 may listen to the data frame transmitted by the access point 710. The terminal 730 may identify an end time of the data frame based on a result of the listening to the data frame. The terminal 730 may compute an end time of the data frame using a predetermined field of the data frame 712. Also, the terminal 730 may transmit the data frame 731 having the computed end time to the access point 710.

Figure 8:
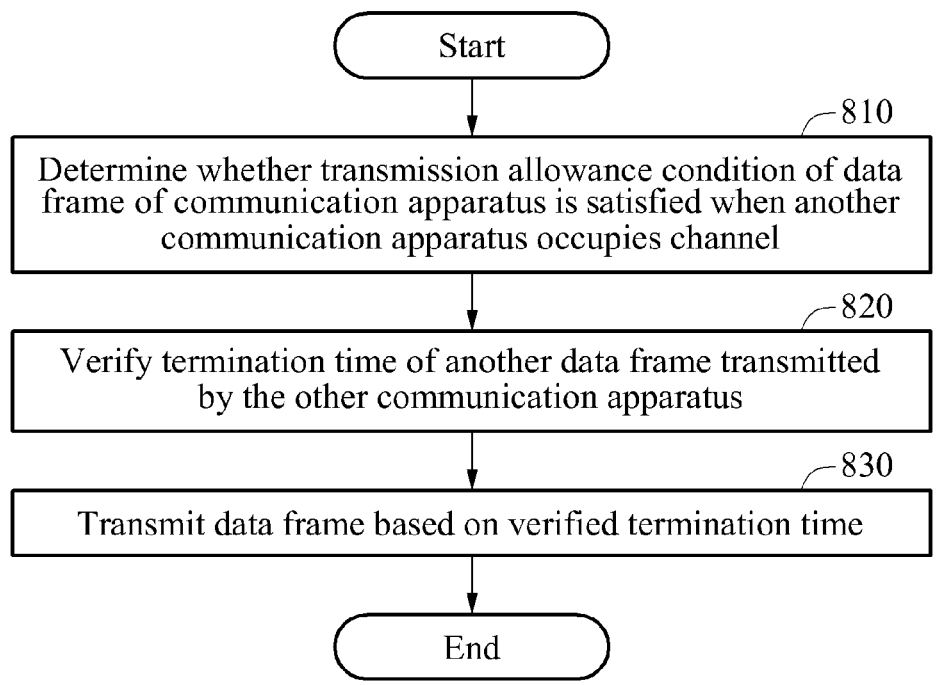
FIG. 8 illustrates an example of a data frame transmission method of a m communication apparatus.

FIG. 8 illustrates an example of a data frame transmission method of a communication apparatus.

Each of the communication apparatus and another communication apparatus performs a random backoff to transmit a data frame thereof. In an example of the wireless network environment of FIG. 1, the communication apparatus may correspond to AP2 and the other communication apparatus may be Terminal1. In an example of the wireless network environment of FIG. 6, the communication apparatus may correspond to Terminal2 and the other communication apparatus may be AP1.

In an example of the wireless network environment of FIG. 1, the communication apparatus, for example, AP2 may perform the random backoff to transmit a data frame to Terminal2 connected to AP2. Also, the other communication apparatus, for example, Terminal1 may perform the random backoff to transmit a data frame to AP 1.

In an example of the wireless network environment of FIG. 6, the communication apparatus, for example, Terminal2 may perform the random backoff to transmit a data frame to AP1. Also, AP1 may perform the random backoff to transmit a data frame to Terminal1 connected to AP1.

When the random backoff of the other communication apparatus is terminated, the other communication apparatus occupies a channel. When the other communication apparatus occupies the channel, the communication apparatus determines whether a transmission allowance condition of the communication apparatus is satisfied in operation 810. The communication apparatus may determine whether the communication apparatus is allowed to perform data frame transmission simultaneously with the other communication apparatus in a state in which the other communication apparatus occupies the channel.

As an example, the communication apparatus may determine whether the transmission allowance condition is satisfied based on whether the communication apparatus listens to each of an RTS transmitted by the other communication apparatus and a CTS corresponding to a response to the RTS. While occupying the channel, the other communication apparatus may transmit the RTS to a target. In this example, the communication apparatus may listen to the RTS. Based on a result of the listening to the RTS, the communication apparatus may set an NAV. When the communication apparatus does not listen to the CTS, the communication apparatus may initialize the NAV. Based on a result of the initializing, the communication apparatus may determine that the communication apparatus is allowed to transmit the data frame irrespective of a channel occupation of the other communication apparatus.

When the transmission allowance condition is determined to be satisfied, the communication apparatus verifies an end time of another data frame transmitted by the other communication apparatus in operation 820. The communication apparatus may identify the end time of another data frame based on a result of listening to another data frame. For example, the communication apparatus may listen to another data frame, and verify length information on another data frame based on a result of the listening. The communication apparatus may compute a point in time at which transmission of another data frame is terminated based on the length information.

The communication apparatus may generate the data frame such that an end time of the data frame matches the end time of another data frame.

When the end time of the data frame differs from the end time of another data frame, the communication apparatus may adjust a length of the data frame. As an example, when the end time of the data frame differs from the end time of another data frame due to a large quantity of data to be transmitted, the communication apparatus may divide a predetermined field, for example, a data field. By dividing the data field, the end time of the data frame may be matched to the end time of another data frame. Also, when the end time of the data frame differs from the end time of another data frame due to a lower quantity of data to be transmitted, the communication apparatus may insert a padding to the data frame. A padding bit may be added to behind the data field. By inserting the padding, the end time of the data frame may be matched to the end time of another data frame.

In operation 830, the communication apparatus transmits the data frame based on the verified end time.

The communication apparatus may receive a first response to the data frame. The other communication apparatus may receive a second response to the another data frame. Since the end time of the data frame transmitted by the communication apparatus is identical to the end time of another data frame transmitted by the other communication apparatus, a transmission time of the first response may be identical to a transmission time of the second response. For example, the first response and the second response may be transmitted simultaneously. The communication apparatus cannot listen to the second response and the other communication apparatus cannot listen to the first response.

Since the descriptions provided with reference to FIGS. 1 through 7 are also applicable here, repeated descriptions with respect to FIG. 8 will be omitted for increased clarity and conciseness.

Figure 9:
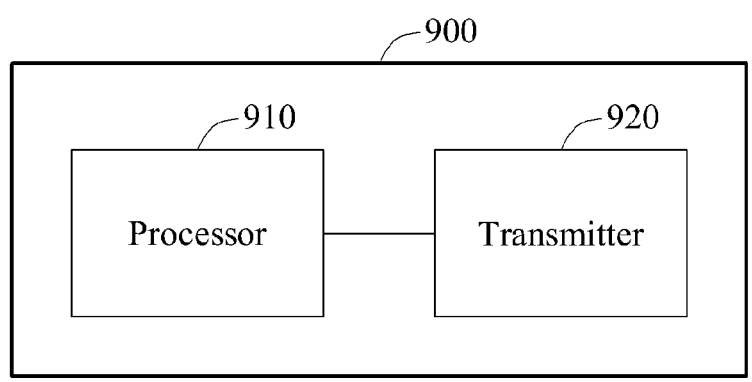
FIG. 9 illustrates an example of a communication apparatus.

FIG. 9 illustrates a communication apparatus 900.

Referring to FIG. 9, the communication apparatus 900 includes a processor 910 and a transmitter 920.

The processor 910 determines whether a transmission allowance condition of the communication apparatus 900 is satisfied when another communication apparatus occupies a channel. The processor 910 may determine whether the transmission allowance condition is satisfied based on whether the communication apparatus listens to each of an RTS transmitted by the other communication apparatus and a CTS corresponding to a response to the RTS. For example, the processor 910 may set an NAV based on a result of listening to the RTS. Also, when the communication apparatus 900 does not listen to the CTS, the processor 910 may initialize the NAV. Based on a result of the initializing, the processor 910 may determine that the communication apparatus 900 is allowed to transmit a data frame.

When the transmission allowance condition is satisfied, the processor 910 verifies an end time of another data frame transmitted by the other communication apparatus. The processor 910 may identify the end time of another data frame based on a result of listening to another data frame. For example, the processor 910 may verify a length of another data frame based on a result of listening to another data frame. Also, the processor 910 may generate the data frame such that an end time of the data frame matches the verified end time. In this example, when the end time of the data frame differs from the verified end time, the processor 910 may adjust a length of the data frame, thereby matching the end time of the data frame and the verified end time. As an example, the processor 910 may match the end time of the data frame and the verified end time by inserting a padding to the data frame or through a data division.

The transmitter 920 transmits the data frame based on the verified end time.

Since the descriptions provided with reference to FIGS. 1 through 8 are also applicable here, repeated descriptions with respect to FIG. 9 will be omitted for increased clarity and conciseness.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A data frame transmission method of a communication apparatus, the method comprising:
   determining whether a transmission allowance condition of a data frame of the communication apparatus is satisfied when an other communication apparatus occupies a channel;
   listening to another data frame transmitted by the other communication apparatus;
   verifying an end time of the another data frame transmitted based on the length information included in the another data frame; and
   transmitting the data frame based on the verified end time.

2. The method of claim 1, wherein the determining comprises determining whether the transmission allowance condition is satisfied based on whether listening to each of a request to send (RTS) transmitted by the other communication apparatus and a clear to send (CTS) corresponding to a response to the RTS is transmitted.

3. The method of claim 2, wherein the determining comprises:
   setting a network allocation vector (NAV) based on a result of listening to the RTS;
   initializing the NAV when the communication apparatus does not listen to the CTS; and
   determining that transmission of the data frame of the communication apparatus is allowed based on a result of the initializing.

4. The method of claim 1, further comprising:
   generating the data frame such that an end time of the data frame matches the verified end time.

5. The method of claim 4, wherein the generating comprises adjusting a length of the data frame when the end time of the data frame differs from the verified end time.

6. The method of claim 1, wherein the communication apparatus is a first access point, and the other communication apparatus is a terminal located in an overlapping area between a service area of the first access point and a service area of a second access point connected to the other communication apparatus.

7. The method of claim 1, wherein the other communication apparatus is an access point capable of performing data frame transmission and data frame reception in the channel, simultaneously.

8. A data frame transmission method of a communication apparatus, the method comprising:
   determining whether the communication apparatus is allowed to perform data frame transmission to an other communication apparatus while a channel is occupied by the other communication apparatus;
   listening to another data frame transmitted by the other communication apparatus;
   verifying an end time of the another data frame based on the length information included in the another data frame; and
   transmitting a data frame of the communication apparatus such that an end time of the data frame matches an end time of the another data frame transmitted by the other communication apparatus.

9. The method of claim 8, wherein the determining comprises:
   setting a network allocation vector (NAV) based on a result of listening to a request to send (RTS) transmitted by the other communication apparatus; and
   initializing the NAV when the communication apparatus does not listen to a clear to send (CTS) corresponding to a response to the RTS.

10. The method of claim 8, wherein the transmitting comprises:
    generating the data frame based on the length information.

11. The method of claim 10, wherein the transmitting comprises adjusting a length of the data frame when the end time of the data frame differs from the end time of the another data frame.

12. A communication apparatus comprising:
    a processor configured to:
        determine whether a transmission allowance condition of the communication apparatus is satisfied when an other communication apparatus occupies a channel;
        listen to another data frame transmitted by the other communication apparatus;
        verify an end time of the another data frame transmitted by the other communication apparatus based on the length information included in the another data frame; and
    a transmitter configured to transmit the data frame based on the verified end time.

13. The apparatus of claim 12, wherein the processor is configured to determine whether the transmission allowance condition is satisfied, based on whether listening to each of a request to send (RTS) transmitted by the other communication apparatus and a clear to send (CTS) corresponding to a response to the RTS is transmitted.

14. The apparatus of claim 13, wherein the processor is configured to set a network allocation vector (NAV) based on a result of listening to the RTS, initialize the NAV when the communication apparatus does not listen to the CTS, and determine that transmission of the data frame of the communication apparatus is allowed based on a result of the initializing.

15. The apparatus of claim 12, wherein the processor is configured to generate the data frame such that an end time of the data frame matches the verified end time.

16. The apparatus of claim 12, wherein the processor is configured to adjust a length of the data frame when an end time of the data frame differs from the verified end time.

17. The apparatus of claim 12, wherein the communication apparatus is a first access point, and the other communication apparatus is a terminal located in an overlapping area between a service area of the first access point and a service area of a second access point connected to the other communication apparatus.

18. The apparatus of claim 12, wherein the other communication apparatus is an access point capable of performing data frame transmission and data frame reception in the channel, simultaneously.

* * * * *